UNITED STATES PATENT OFFICE.

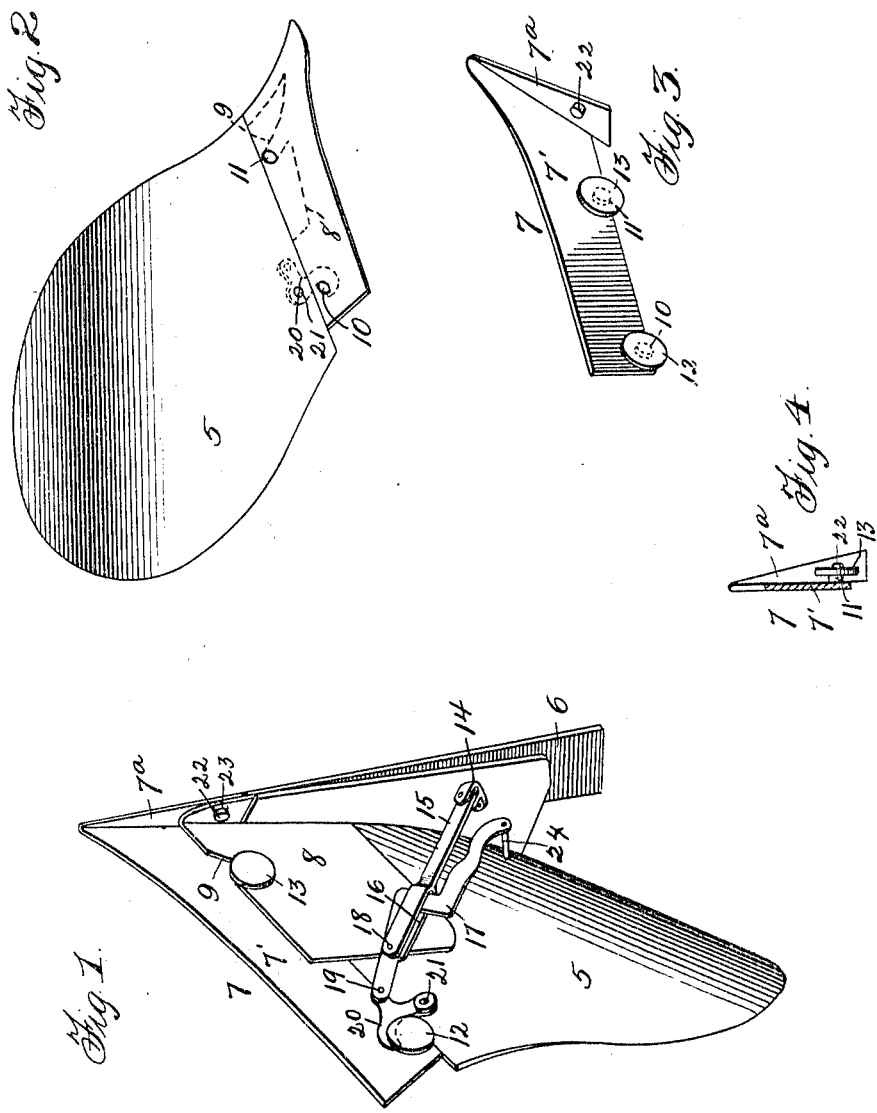
E. OLSON.
PLOWSHARE SECURING ATTACHMENT FOR PLOWS.
APPLICATION FILED JUNE 30, 1913.
1,096,940.  Patented May 19, 1914.
Inventor
Edward Olson
Witnesses

EDWARD OLSON, OF ROBBIN, MINNESOTA.

PLOWSHARE-SECURING ATTACHMENT FOR PLOWS.

1,096,940.  Specification of Letters Patent.  Patented May 19, 1914.

Application filed June 30, 1913. Serial No. 776,573.

*To all whom it may concern:*

Be it known that I, EDWARD OLSON, a citizen of the United States of America, residing at Robbin, in the county of Kittson and State of Minnesota, have invented certain new and useful Improvements in Plowshare-Securing Attachments for Plows, of which the following is a specification.

This invention relates to plow share securing attachments for plows and has for its object, the provision of a device of this character adapted to be secured to the moldboard and land-side of the plow and acting in conjunction with elements carried by the plow share for drawing the plow share into engagement with the land-side and moldboard, together with means for automatically locking the parts in their plow-share securing position.

Further objects and advantages of the invention will be set forth in the detailed description which now follows.

In the accompanying drawing, Figure 1 is an underside perspective view of the land-side and mold-board of a plow, showing the attachment in locked position; Fig. 2 is a side elevation of the mold-board and plow share; Fig. 3 is a detail perspective view of the plow share, and Fig. 4 is a transverse vertical section through the plow share.

Like numerals designate corresponding parts in all of the figures of the drawing.

Referring to the drawing, the numeral 5 designates the mold-board; 6, the land-side, and 7, the plow share. This share comprises the elongated body portion 7', which, when in use, lies in position to form a continuation of the mold-board and 7ᵃ, which, when in position, lies in longitudinal alinement with and forms a continuation of the land-side. A frog 8 is secured in position with its lower edge projecting beyond the lower edge of the mold-board and this frog is provided with an inclined slot 9. The plow share carries studs 10 and 11 having enlarged heads 12 and 13. A bracket 14 secured to the land-side has pivoted therein one end of a lever 15, said lever being bifurcated at 16 for the reception of a hand lever 17. The lever 15 has pivotal engagement at 18 with lever 17 and lever 17 in turn, has pivotal engagement at 19 with the hook 20. This hook is pivoted at 21 to the mold-board 5. A stud 22 carried by the portion 7ᵃ of the plow share passes through an opening 23 of shoe 8 when the parts are in their assembled position. A handle 24 carried by lever 17 provides means for operating the device.

It is thought that the operation of the structure will be apparent from the description already given. However, it may be briefly stated that the stud 11 is entered in slot 9 and the plow share moved rearwardly to bring it into the position shown in Fig. 2. This in turn brings the stud 11 into the upper end of the slot. The handle 24 is thereupon shoved forward and this moves pivot point 19 downwardly and causes the hook to swing in beneath stud 10. This action not only draws the plow share into firm engagement with the mold-board and land-side and frog 8, but effectually prevents disengagement of these parts. Furthermore, the operation of shoving the handle 24 forwardly causes the pivot 18 to move to a point beyond a line drawn from pivot point 19 and the pivotal point of the mounting of lever 15 in bracket 14. The result is to automatically lock these parts against accidental disengagement, for it is apparent that the tendency of the pivot point 19 is to move toward pivot point 14, but this is prevented by the abutment of lever 17 against lever 15.

From the foregoing description, it will be seen that very simple means have been provided for quickly and effectively locking the plow share into engagement with the mold-board and land-side.

While the elements shown and described are well adapted to serve the purposes for which they are intended, it is to be understood that the invention is not limited to the precise construction set forth but includes within its purview such changes as may be made within the scope of the appended claims.

Having described my invention, what I claim is:

1. In a device of the character described, the combination with a plow share, mold-board and land-side, of a frog by which the mold-board is carried having an inclined slot formed in its lower edge, a pair of studs carried by the plow share, one of which engages in said slot, a pair of levers pivotally connected to each other, one of said levers being pivotally connected at one end to the land-side, and a swingingly mounted member of hook formation pivoted to the mold-board and adapted to engage beneath the other of said studs, the other of said levers having pivotal engagement with said member of hook formation.

2. In a plow construction, the combination with the usual mold-board, land-side and plow share, of a frog by which the mold-board is carried, said frog having an upwardly and rearwardly directed slot formed in its under edge, a pair of headed studs carried by said plow share, one of which engages in said slot, a hook mounted for swinging movement upon the mold-board and adapted when swung to move beneath the other of said studs to prevent movement of the plow share with relation to the mold board, a manually operable lever pivoted at one end to said hook, and a second lever pivoted at one end to the first named lever and at the opposite end to the land-side.

3. In a plow construction, the combination with the usual mold-board, land-side and plow share, of a frog by which the mold-board is carried, said frog having an upwardly and rearwardly directed slot formed in its under edge, a pair of headed studs carried by said plow share, one of which engages in said slot, a hook mounted for swinging movement upon the mold-board and adapted when swung to move beneath the other of said studs to prevent movement of the plow share with relation to the mold board, a manually operable lever pivoted at one end to said hook and a second lever pivoted at one end to the first named lever and at the opposite end to the land-side, the throw of the parts being such that when the hook has moved to operative position, the pivot point of engagement of the last named lever with the first named lever is moved beyond the center to thereby automatically lock the parts in operative position.

In testimony whereof I affix my signature in presence of two witnesses.

EDWARD OLSON.

Witnesses:
J. R. STONG,
A. E. HANSON.